Feb. 24, 1970     A. CELINDER ET AL     3,496,832
WORKPIECE POSITIONING DEVICE
Filed June 30, 1966     4 Sheets-Sheet 1
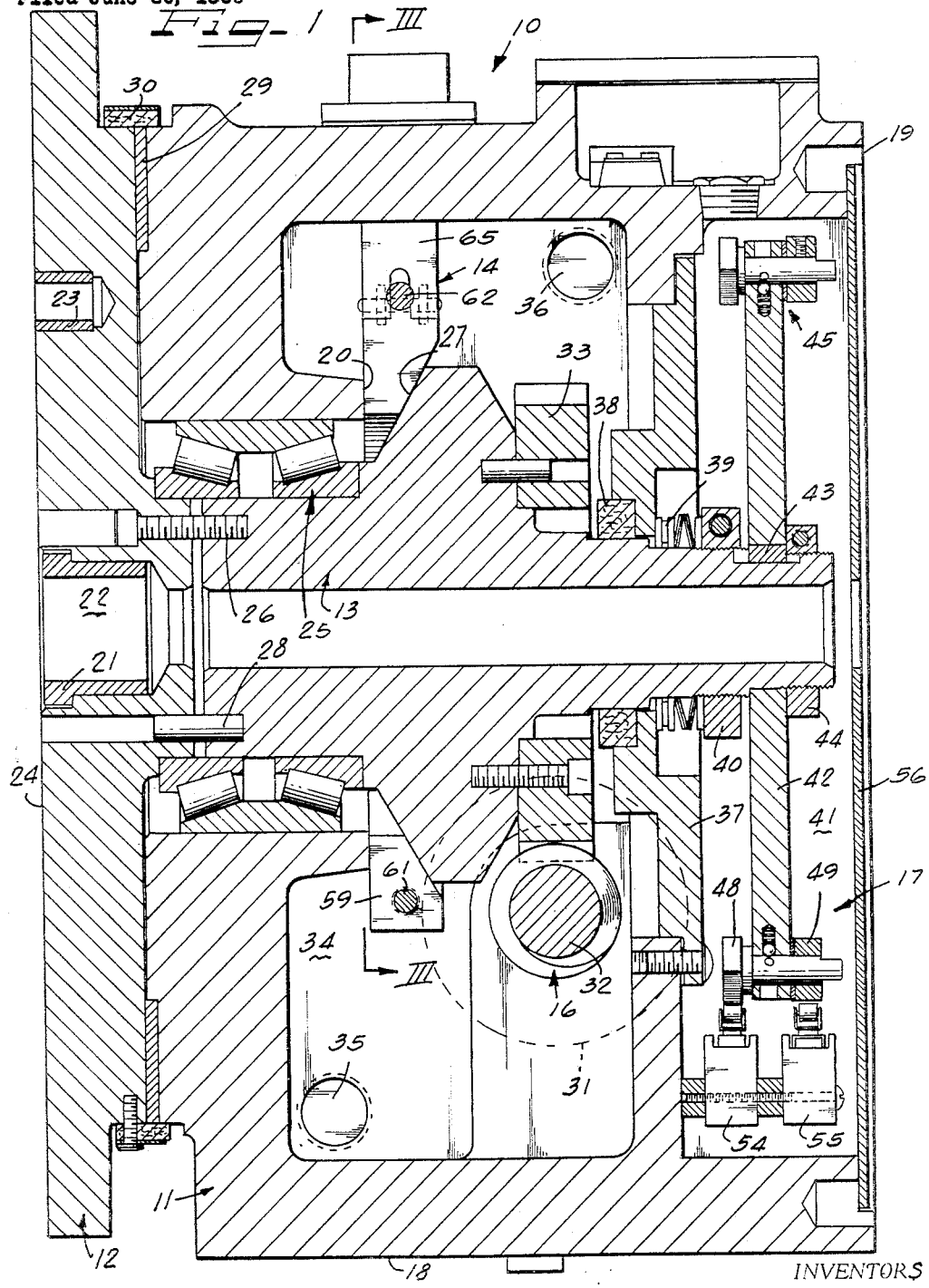
INVENTORS
ALF CELINDER
JOSEPH F. LANG
BY *Hill, Sherman, Meroni, Gross & Simpson* ATTORNEYS

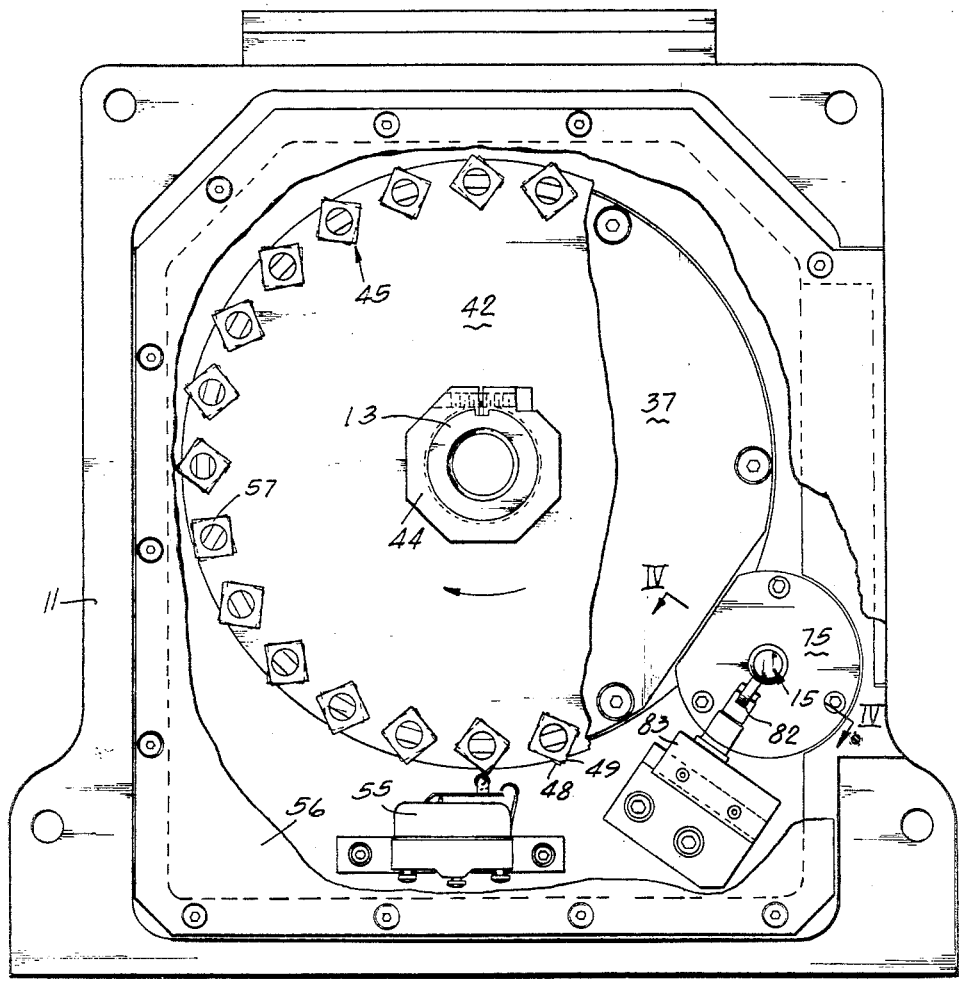

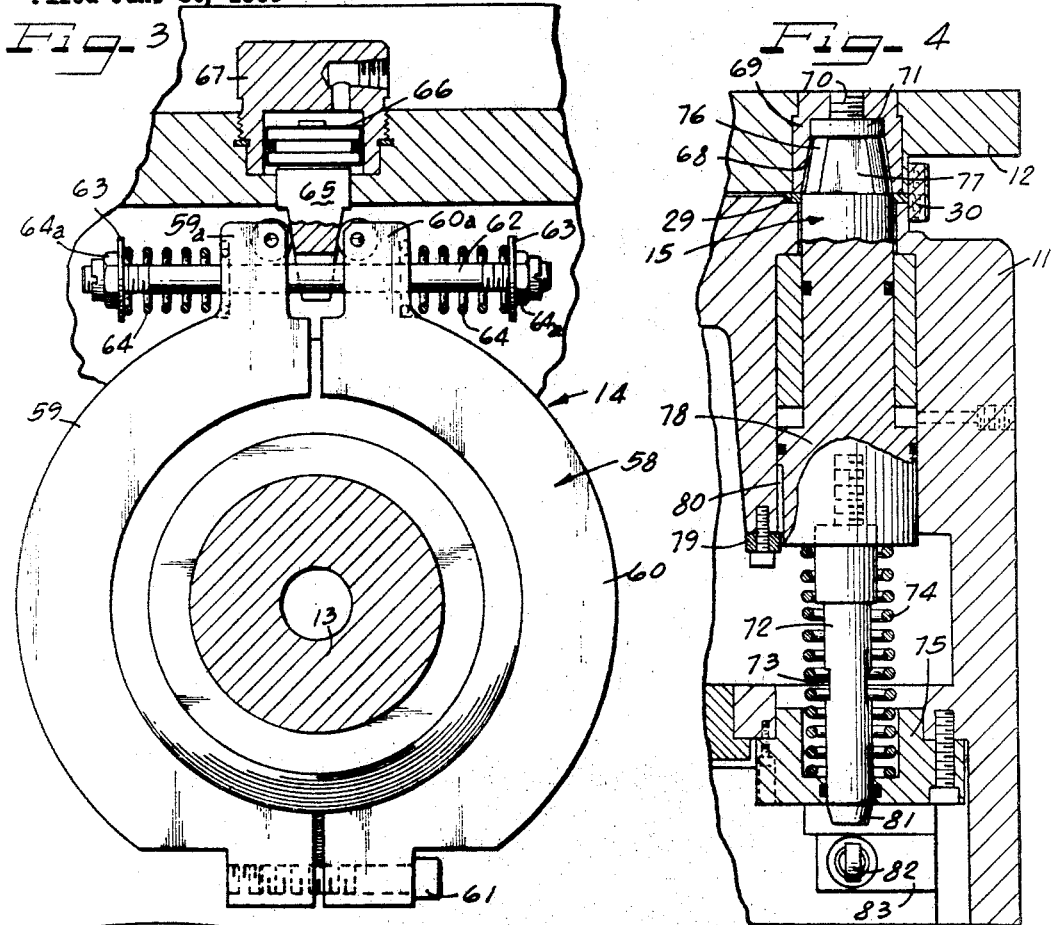
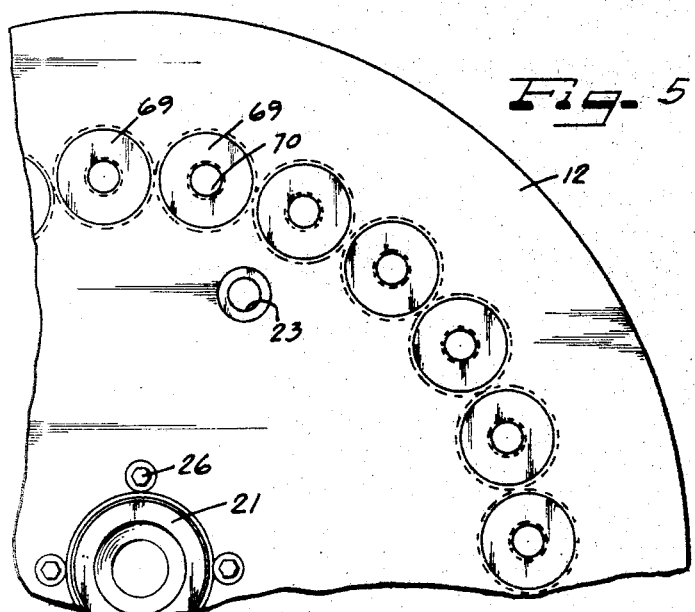
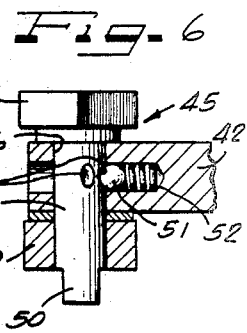
INVENTORS
ALF CELINDER
JOSEPH F. LANG
ATTORNEYS

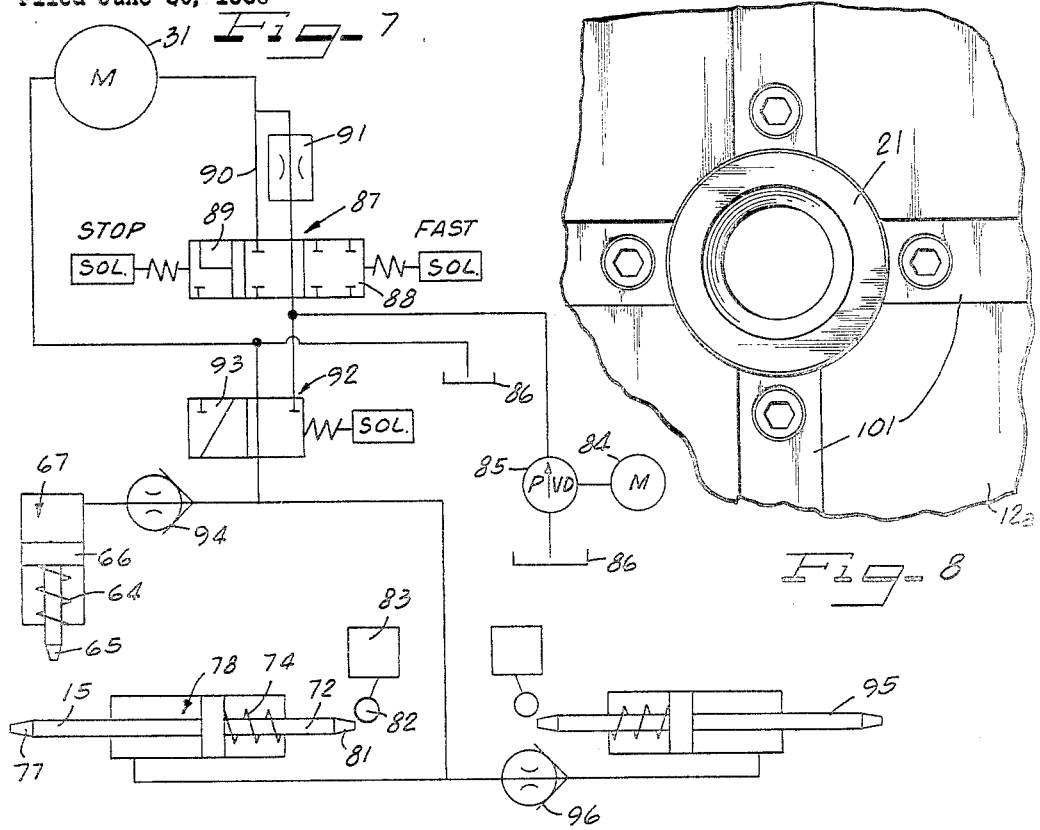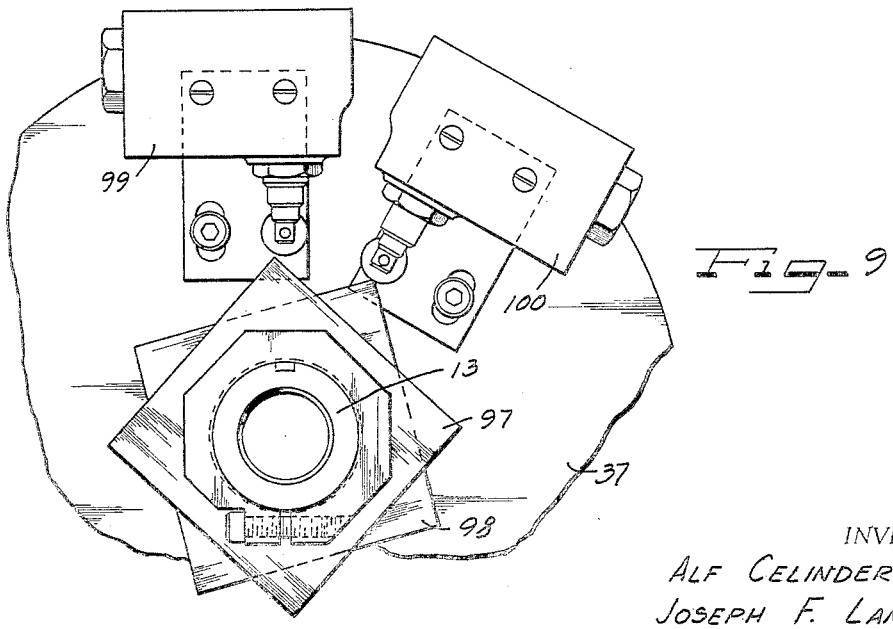

3,496,832
WORKPIECE POSITIONING DEVICE
Alf Celinder, Newport Beach, and Joseph F. Lang, Garden
 Grove, Calif., assignors to Houdaille Industries, Inc.,
 Buffalo, N.Y., a corporation of Michigan
   Filed June 30, 1966, Ser. No. 561,931
   Int. Cl. B23f 23/08; B23b 29/24; B23q 17/00
U.S. Cl. 90—56                              12 Claims

ABSTRACT OF THE DISCLOSURE

A workpiece positioning table assembly has a base with alternative mounting surfaces extending at right angles to each other, the device having a passage through the rotational axis of the workpiece-supporting-table. The rotatable table has a spring-biased shotpin which defines various table positions which are locked by an internal spring-biased brake, a fluid-pressure actuated wedge serving to release such brake simultaneously with fluid-pressure-actuated retraction of the shotpin to enable indexing of the table to the next position as defined by two series of cams which control the various elements.

---

This invention relates generally to a machine tool construction, and more specifically to means by which a workpiece may be selectively positioned or indexed by predetermined angles about a reference axis.

Although the principles of the present invention may be included in various machine tools, a particularly useful application is made in a machine tool having a bed on which a workpiece is to be supported in several positions. Still more specifically, an especially useful application is made in a workpiece-supporting table that is rotatably supported so as to hold the workpiece adjustably in proper position with respect to the machining head of the machine tool.

The present invention contemplates the utilization of angular positioning means which goes directly to a predetermined angular position, without overshoot, the structure being so made that the indexing axis or rotational axis of the index table may be disposed either vertically or horizontally.

Accordingly, it is an object of the present invention to provide a rotary or index table for supporting the workpiece which utilizes more than one rate of operation.

Another object of the present invention is to provide a workpiece positioning device having a rotary index table which may be rotated about an axis that can be disposed either horizontally or vertically.

A still further object of the present invention is to provide means for locating a rotary index table in a precise angular position.

Yet another object of the present invention is to provide a brake construction for a workpiece positioning device of the rotary type.

Another object of the present invention is to provide means by which the various control functions incident to operation of the workpiece positioning device will occur in a predetermined sequence.

A still further object of the present invention is to provide means enabling the workpiece positioning device to ignore and to pass by certain selected predetermined angular stopping positions that are built into the machine.

Many other advantages, features and additional objects of the present invention will become manifest to those versed in the art upon making reference to the detailed desscription and the accompanying sheets of drawings in which a preferred structural embodiment incorporating the principles of the present invention is shown by way of illustrative example.

On the drawings:

FIG. 1 is a cross-sectional view of a workpiece positioning device constructed in accordance with the principles of the present invention;

FIG. 2 is a view of the right side of the machine as shown in FIG. 1, in reduced scale, with certain components broken away partially;

FIG. 3 is a fragmentary cross-sectional view taken along line III—III of FIG. 1, in slightly reduced scale;

FIG. 4 is an enlarged fragmentary cross-sectional view taken along line IV—IV of FIG. 2;

FIG. 5 is a fragmentary elevational view of a portion of the left side of the structure shown in FIG. 1;

FIG. 6 is an enlarged fragmentary cross-sectional view of a portion shown in FIG. 1;

FIG. 7 is a schematic diagram of a hydraulic control circuit used with the device;

FIG. 8 is a fragmentary elevational view of a modified form of the device wherein FIG. 8 otherwise corresponds generally to FIG. 5; and FIG. 9 is an enlarged fragmentary view of a portion of such modified form wherein FIG. 9 otherwise generally corresponds to the structure shown in FIG. 2.

As shown on the drawings:

The principles of this invention are particularly useful when embodied in a workpiece positioning device for use with a machine tool such as illustrated in FIG. 1, generally indicated by the numeral 10. The positioning device 10 includes a base 11 which rotatably supports a workpiece-supporting table 12, such support being at least in part provided by a shaft 13 on which a brake 14 acts. When the brake 14 is released and a shotpin 15 (FIG. 4) is retracted, a motor-driven means 16 is arranged to rotate the shaft 13 and table 12 until a predetermined angle is reached which is signaled by a cam and switch arrangement generally indicated at 17.

The base 11 includes a horizontal mounting surface 18 on which the device 10 may be supported for holding the rotational axis of the table 12 in a horizontal direction. The base 11 includes a further horizontal mounting surface 19 disposed at a right angle to the surface 18, for holding the device 10 in such a position that the rotational axis of the table 12 is vertical. The base 11 further includes a wedging surface 20 which forms a functional part of the brake 14 as explained below.

The workpiece supporting table 12 has a central bushing 21 which defines a circular recess 22 that is receptive of locating means on the workpiece to serve as a reference for the axis about which the table 12 is rotatable. The table 12 includes a further bushing 23 which is receptive of means carried by the workpiece or a fixture associated with the workpiece for serving as a reference for 0° angular position. The table 12 and the shaft 13 are axially hollow so that auxiliary lines may pass therethrough to control actuators, motors and the like which may be carried on the supporting surface 24 of the table 12.

The shaft 13 and the table 12 jointly embrace and are supported by suitable bearings generally indicated at 25, the shaft 13 and the table 12 having confronting shoulders drawn against the bearing means 25 by means of a number of screws 26. The shaft 13 has an external brake surface 27 which extends about the rotational or longitudinal axis of the shaft 13. Thus the table 12 and the shaft 13 may rotate as a single unit and their relative angular position is precisely defined by means of a number of suitable pins 28. Further rotational support for the table 12 is provided by an axially directed face bearing 29 of any suitable material, which is surrounded by a felt wiper 30 which extends entirely around the device 10.

The motor-driven means 16 includes a fluid motor 31 which drives a worm gear 32 that meshes with a ring gear 33 which is rigidly and precisely secured to the shaft 13.

The internal structure thus far described is disposed within an oil cavity 34 which has a drain plug 35 and a filling plug 36, and preferably includes a sight glass (not shown) for determining that an adequate amount of oil is present. The oil chamber 34 is closed by an inner cover 37 secured to the base 11 and having a suitable seal 38. If desired, a further spring-loaded seal 39 may be provided, the same being held in place by means of a lockable nut 40 carried on the shaft 13. The right end of the shaft 13 shown in FIG. 1 thus extends through the inner cover 37 into a chamber 41 provided for the switch and cam means 17.

The switch and cam means 17 includes a program plate 42 which is keyed as at 43 to the shaft 13 and which is held in place by a lockable nut 44. Various preselected cam stations 45 are provided about the periphery of the program plate 42. As best seen in FIG. 6, each cam station 45 includes a transverse aperture 46 through which there extends a stub shaft 47 carrying a pair of cams 48, 49, also referred to herein as paired cams. The stub shaft 47 terminates at one end in a wrenching surface 50. A ball 51 and spring 52 to act with either of two recesses 53, 53 to hold the stub shaft 47 in a predetermined angular position. These two angular positions are substantially 45° apart. The cam 48 coacts with a creep switch 54 while the cam 49 coacts with a final or stop switch 55. The chamber or cavity 41 is closed by a further cover 56.

As shown in FIG. 2, the program cam 42 has been provided with 24 cam stations 45, and in this embodiment, the switches 54 and 55 are exactly in alignment with each other. As explained below, it is not desired that the switches 54 and 55 should be actuated at the same moment. Rather, the switch 54 is first actuated by one of the cams 48, after which the other cam 49 actuates the switch 55. As explained below, actuation of the switch 54 reduces the speed of operation of the motor 31 to a creep, while actuation of the switch 55 halts operation of the motor 31. The program plate 42, having the 24 cam stations 45 which are equally spaced thus enables the table 12 to be stopped at 15° increments. As shown in FIG. 2, all of the cam stations 45, except one identified at 57, have been so positioned that each will arrest the table movement. The cam station identified by the numeral 57 has been adjustably rotated or positioned so that no portion of the cam surface of the paired cams can engage either of the actuators of the switches 54, 55.

The brake 14 includes the wedging surface 20 on the base 11 and the brake surface 27 on the shaft 13, together with brake shoe means 58 best seen in FIG. 3. The brake shoe means 58 includes a pair of brake shoes 59, 60 which wedge between the wedging surface 20 and the brake surface 27. Such wedging is effected by the fact that the brake shoes 59 and 60 are joined together at one side of the shaft by a loose fitting screw 61, and at the other side of the shaft by means including a tie bolt 62, threaded at each end, and provided with a washer 63 and nut 64a at each end. The brake shoes 59 and 60 have a generally radially extending projections 59a, 60a, through which the tie bolt 62 extends. A pair of springs 64, 64 acts between the washers 63 and the projections 59a, 60a to thereby wedge the brake shoes against the surfaces 20, 27. While the spring means 64 urge the shoes 59, 60 against the surfaces 20 and 27, a power-driven cam member 65 has an opposite effect. The cam member 65 is a release member that acts on anti-friction rollers carried by the brake shoes 59, 60. The cam member 65 is secured to a piston 66 of a fluid actuator assembly 67. In the absence of any fluid pressure on the actuator 67, the springs 64 maintain the brake 14 in an engaged condition. When fluid pressure is applied to the actuator 67, the cam member 67 acts to unwedge or separate the brake shoes 59, 60, thereby freeing the shaft 13 for rotation.

As shown in FIGS. 4 and 5, the table 12 is provided with a series of recesses 68 which open toward the base 11 and which are receptive of the entrant end of the shotpin 15. The table 12 has a number of inserts 69 which overlie the face bearing 29 and which are shouldered to prevent possible separation. The inserts 69 have a threaded opening 70 which can be used for workpiece locating purposes, and for aiding in the assembly and disassembly or replacement of inserts 69. Preferably, each of the recesses 68 separated from each of the openings 70 by means of a filler plug 71 which prevents cutting oil from reaching the recess 68. The shotpin 15 has an axial extension 72 threaded thereto, which may be made integral therewith. When threaded, a wrenching surface 73 is preferably provided. A spring 74 acting between a guide 75 secured to the base 11 and the shotpin 15 biases the shotpin 15 in a direction so that its entrant end 76 is normally disposed in one of the recesses 68. The recess 68 is slightly oval so that the dimension of the recess 68 along a radius of the table is not critical. Rather, it is the location or spacing of confronting surfaces in the recess 68 along an arcuate increment parallel to the circumference which is accurately maintained. Moreover, these confronting surfaces are preferably made flat and slightly tapering, and the entrant end 76 of the shotpin 15 is correspondingly shaped to have a pair of flat surfaces 77. The flat surfaces 77 are similar to opposite sides of a truncated pyramid, and flatwise and wedgingly engage corresponding surfaces on the insert 68. The shotpin 15 is provided with a power-driven retractor 78, the same being a linear fluid actuator in this embodiment which is biased by the spring 74. In view of the use of the flat surfaces 77, an angular locating key 79 is carried by the base 11 and extends into a slot 80 in the shotpin 15 to preclude rotation thereof. The axial extension 72 is provided with a cam end 81 which is engageable with the actuator 82 of a switch 83 when the shotpin 15 is retracted out of the table 12. Thus means are provided for indicating that the shotpin 15 is out of engagement with the table 12.

The fluid motor 31, the brake retractor 67, and the shotpin retractor 78 are operated by a pressurized fluid system such as shown in FIG. 7. The various electric solenoids of that system may be controlled by manually operated switches or by relays under the control of an N/C tape device. The fluid system includes a motor 84 which drives a variable delivery pump 85 that has an intake extending into a sump 86 and an outlet connected by a line to the inlet of a 4-way valve 87. The valve means 87 is spring-biased to a central position, and is normally energized so that a stop position or section 88 normally blocks all fluid flow. When it is desired to rotate the table 12, the valve means 87 is positioned so that a "fast" section or position 89 is placed into alignment with the inlets and outlets, thereby effecting normal operation of the motor 31 by means of fluid flowing primarily through a line 90. Used fluid is returned directly to the sump 86. As the desired position is approached, the creep switch 54 is actuated as explained above, thereby shifting the valve means 87 to the position shown in FIG. 7. Under this condition, fluid to the motor 31 must pass through a suitable restrictor such as a flow control valve 91 which causes the motor 31 to rotate at a much reduced rate. This reduced rate of operation continues until the switch 55 is actuated, which shifts the valve 87 so that the position or section 88 is aligned with the fluid lines, thereby blocking fluid flow. Thus means are provided which are responsive to the angular position of the table for reducing the rate of operation of the motor-driven means 16, and means are also provided which are responsive to the angular position of the table for halting operation of the motor-driven means 16.

At a proper time, a 3-way valve 92 is also operated. The valve 92 is spring-biased to the position as shown, thereby enabling the spring means 64 of the brake 14 to return the piston 66 such as to expel the fluid to the sump, and thereby also enabling the spring 74 to expel the fluid from the actuator or retractor 78 to similarly return fluid to the sump. When it is desired to initiate table rotation, the brake 14 and the shotpin 15 must first be respectively disengaged and retracted. Therefore, the valve 92 is energized, thereby shifting its position so that the section or position 93 is aligned with the pressure line leading to the pump 85. Fluid flows at a high rate to effect rapid movement of the pistons and hence the respective release and retraction. When the retraction of the shotpin has been completed, such completion is signaled by actuation of the switch 83 which can then be used to initiate proper actuation of the valve means 87 for the motor 31. The motor 31 may be signaled to halt slightly before the precise ultimate desired angular position is attained, and this signal may also be employed to actuate the valve 92 thereby effecting advancement of the shotpin 15. Its entrant end or flat cam surfaces 77 thereupon act against the corresponding surfaces in the recess 68 in the table to complete and to precisely and accurately make the last increment of movement of the table 12. Therefore, such movement is accompanied by no overshoot or hunting. It will be noted that the brake actuator 67 is depressurized at the same moment as the actuator for the shotpin 15. However, a bleed type of check valve 94 is employed in series with the actuator 67 so that there is virtually no resistance to the flow of fluid to the actuator 67, but so that fluid being returned is metered gradually. This gradual metering of the fluid from the brake actuator enables the shotpin 15 to be fully seated prior to actual reengagement of the brake 14.

Where the workpiece secured to the index table 12 is relatively long, and is rotated about its longitudinal axis by the index table 12, it may be necessary to employ a tail stock (not shown). To prevent any rotation of the tail stock and hence twisting of the distal end of the workpiece, namely the end supported by the tail stock, a further shotpin may be employed in such tail stock to preclude its rotation. Such further shotpin is illustrated at 95 in FIG. 7 and is provided with components otherwise corresponding to the shotpin 15. However, a valve 96 corresponding to the valve 94 is provided in series with the fluid line to insure that the shotpin for the tail stock is not actuated until the primary shotpin 15 has been fully seated and the index table thus first fully and accurately positioned.

In FIGS. 8 and 9, there are illustrated simplified modifications or special versions of the device shown in FIGS. 1–6. If it is desired to have the device 10 stop in only four positions each 90° apart, the program plate 42 and the switches 54 and 55 may be removed, and in place thereof, the structure shown in FIG. 9 may be provided. Here a pair of cam means 97, 98 are secured directly to the shaft 13. The cam 98 corresponds to the cam 48 while the cam 97 corresponds to the cam 49. Thus the switch 55 has as its counterpart a switch 99, while the switch 54 has as its counterpart a switch 100. Thus the pair of cam means 97, 98 like the cam means 48, 49 is rotatable with the table 12 and on the shaft 13. Thus the cam means 97, 98 like the series of cams 48 and the series of cams 49 provide a series of successive cam surfaces. However, in the embodiment of FIG. 9, all such cam surfaces are disposed on a single cam member 97 or 98. However, the embodiment of FIG. 9 differs in that the basic program cannot be altered without replacement of the cam means 97, 98. As the structure of FIG. 9 presumes specific stopping places for the table 12a, as shown in FIG. 8, inserts 101 may be provided of a hardened type which may be used to locate the workpiece in various ways, to locate successive workpieces, as by apertures, abutments, and the like. It will be understood that various tables 12, 12a, etc. may be employed to suit special circumstances, and that numerous program cams, settings of adjustable cams, or special cams may thus be carried to suit the circumstances.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A workpiece positioning device for use with a machine tool, comprising:
   (a) a base;
   (b) a workpiece-supporting table;
   (c) a shaft rotatably supported by said base, and corotatably secured to and supporting said table, said supporting shaft having an external brake surface within said base;
   (d) brake shoe means within said base acting between said base and said brake surface for locking the angular position of said workpiece-supporting table;
   (e) said brake shoe means having a pair of adjacently spaced projections;
   (f) spring means acting on said projections and normally urging said brake shoe means against said external brake surface on said shaft;
   (g) a wedge member actuated by fluid-pressure means extending between a pair of projecting rollers on said projections for acting against the force of said spring means;
   (h) motor-driven means active between said base and said shaft for rotating said workpiece-supporting table; and
   (i) means responsive to the angular position of said table for controlling said motor-driven means.

2. A workpiece positioning device according to claim 1, in which said motor-driven means is of the fluid-pressure actuated type, including a single valve connected to both said fluid-motor-driven means and said fluid-pressure means for concurrently initiating and for concurrently terminating operation of both said fluid-motor-driven member and said wedge member.

3. A workpiece positioning device for use with a machine tool, comprising:
   (a) a base;
   (b) a workpiece-supporting table rotatably supported on said base;
   (c) motor-driven means active between said base and said table for rotating said table;
   (d) a plate corotatably secured to said table for rotation in a plane parallel to said table and having a series of cam stations at its periphery;
   (e) a pair of concentric cam means comprising a series of paired cams supported by said plate for rotation with said table and corotatable with each other, there being one pair of said paired cams at each of said rotatable cam stations; and
   (f) a pair of switches disposed on said base to be respectively successively engaged by said pair of concentric cam means each time said table is to be stopped, one of said switches being connected to effect a reduction in the rate of operation of said motor-driven means, and the other being connected to halt said operation, said pair of switches being individually and directly successively engaged by a different cam of one of said paired cams on said plate.

4. A workpiece positioning device for use with a machine tool, comprising:
   (a) a base;
   (b) a workpiece-supporting table rotatably supported on said base;
   (c) a fluid-pressure-retractable shotpin carried by said base and normally locating said table in a precise angular position;
   (d) a fluid-pressure-releasable brake normally holding said table against rotation with respect to said base;
   (e) a valve connected to deliver pressurized fluid to said shotpin and to said brake for simultaneously disengaging said brake and retracting said shotpin from said table;
   (f) motor-driven means active between said base and said table for rotating said table;
   (g) means responsive to the angular position of said table for controlling said motor-driven means and said valve; and (h) a bleed-type of check valve connected to said fluid-pressure-releasable brake for enabling rapid disengagement of said brake and for delaying re-engagement of said brake until after said shotpin has relocated said table.

5. A workpiece positioning device according to claim 4 which includes:
(a) a fluid-pressure-retractable tail-stock shotpin connected to said first mentioned valve to be retracted with said first mentioned shotpin; and
(b) a second bleed-type of check valve connected to said fluid-pressure-retractable tail-stock shotpin for enabling rapid retraction thereof and for delaying re-engagement of said tail-stock shotpin until after said first-named shotpin has relocated said table.

6. A workpiece positioning device for use with a machine tool, comprising:
(a) a base;
(b) a workpiece-supporting table rotatably supported on said base;
(c) a shotpin slidably carried by said base and normally extending into a recess in said workpiece supporting table by which a predetermined angular position of said table and a workpiece is accurately established and locked;
(d) actuator means carried by said base for reciprocating said shotpin into and out of said table recess;
(e) switch means carried by said base and responsive to the retracted position of said shotpin; and
(f) a motor controlled by said switch for rotating said table only in response to a retracted position of said shotpin.

7. A workpiece positioning device for use with a machine tool, comprising:
(a) a base;
(b) a workpiece-supporting table rotatably supported on said base;
(c) motor-driven means active between said base and said table for rotating said table;
(d) a pair of concentric cam means each having a plurality of switch actuating surfaces rotatable with said table and corotatable with each other; and
(e) a single pair of switches disposed on said base to be respectively successively engaged by said pair of concentric cam means which coact respectively on said pair of switches to operate them electrically each time said table is to be stopped, one of said switches being connected to effect only a reduction in the rate of operation of said motor-driven means, and the other being connected only to halt said operation.

8. A workpiece positioning device according to claim 7 in which said pair of concentric cam means comprises two series of successive cam surfaces, each series corresponding in number to the number of stopping positions of said table, and said surfaces respectively disposed to engage one of said pair of switches as each predetermined angular position of said table is approached.

9. A workpiece positioning device according to claim 8, in which all of said series of successive cam surfaces of one of said cam means are disposed on one cam member.

10. A workpiece positioning device according to claim 3, which includes means by which each of said paired cams may be jointly adjusted while in its station on said plate for being rotated clear of said switches.

11. A workpiece positioning device according to claim 10, which includes detent means for selectively holding said paired cams in adjusted positions in a path to engage said switches, and in a path to pass clear of said switches.

12. A device according to claim 10, in which said paired cams are respectively carried on stub-shafts rotatably supported at the periphery of said plate for adjustment about axes parallel to the rotational axis of said table.

References Cited

UNITED STATES PATENTS

| | | | |
|---|---|---|---|
| 1,446,829 | 2/1923 | Burrell et al. | |
| 1,934,358 | 11/1933 | Kylin | 74—823 X |
| 2,406,906 | 9/1946 | Saunders | 90—56 X |
| 2,916,950 | 12/1959 | Bullard | 74—821 |
| 2,952,168 | 9/1960 | Leifer | 29—39 X |
| 3,048,059 | 8/1962 | Cross | 74—819 |
| 3,130,358 | 4/1964 | Lang | 74—821 X |
| 3,162,064 | 12/1964 | Musy | 74—822 |
| 3,196,715 | 7/1965 | Rainey | 74—821 |
| 3,213,715 | 10/1965 | Arenson | 74—821 |
| 3,277,789 | 10/1966 | Graham | 90—56 |
| 2,342,539 | 2/1944 | Gorton. | |
| 2,679,787 | 6/1954 | Froehlich | 74—818 |
| 2,784,612 | 3/1957 | Liska | 74—821 X |

GIL WEIDENFELD, Primary Examiner

U.S. Cl. X.R.

74—821, 822; 77—64